Dec. 30, 1958
N. P. GOSS
2,866,703
TREATED MOLTEN METAL
Filed May 28, 1956
5 Sheets-Sheet 1
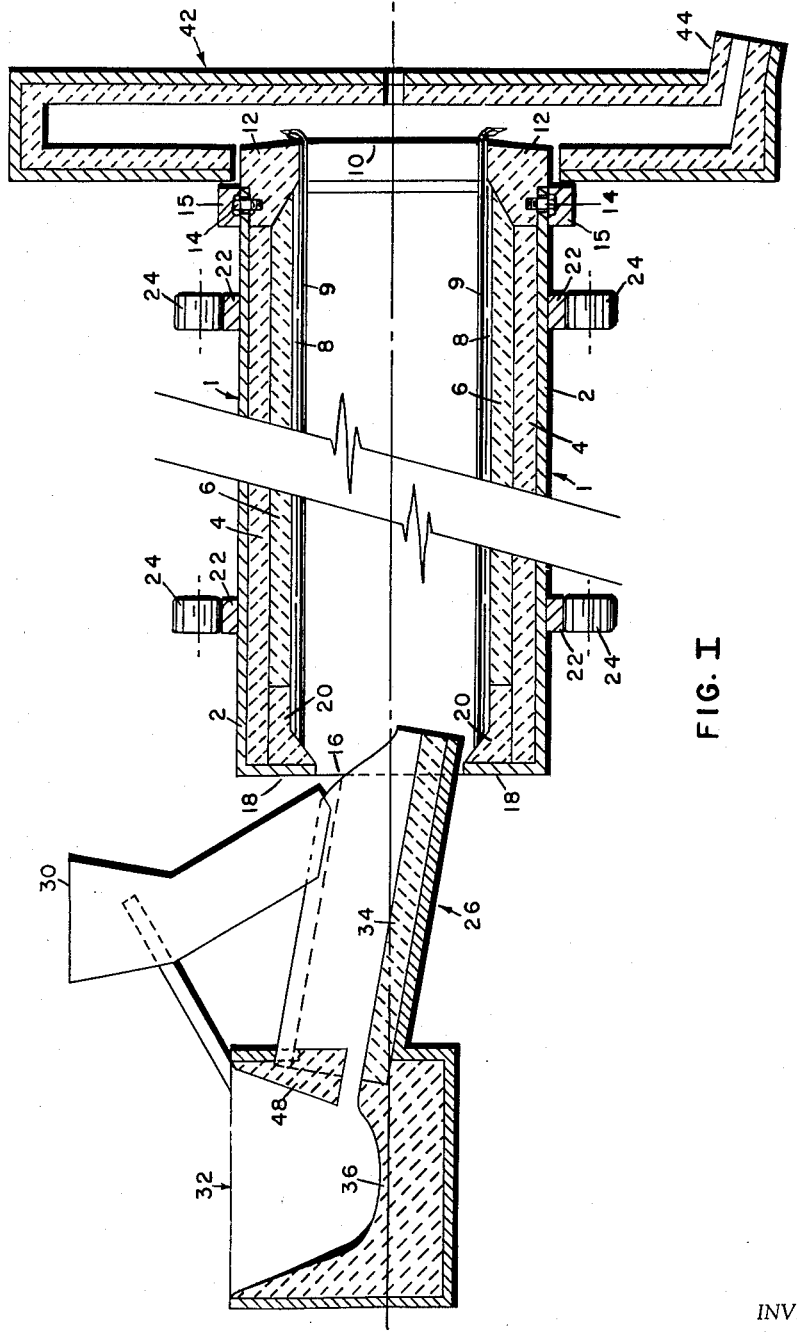
FIG. I
INVENTOR
NORMAN P. GOSS
BY *Nick M. Warburton*
ATTORNEY Dec. 30, 1958 — N. P. GOSS — 2,866,703
TREATED MOLTEN METAL
Filed May 28, 1956 — 5 Sheets-Sheet 2
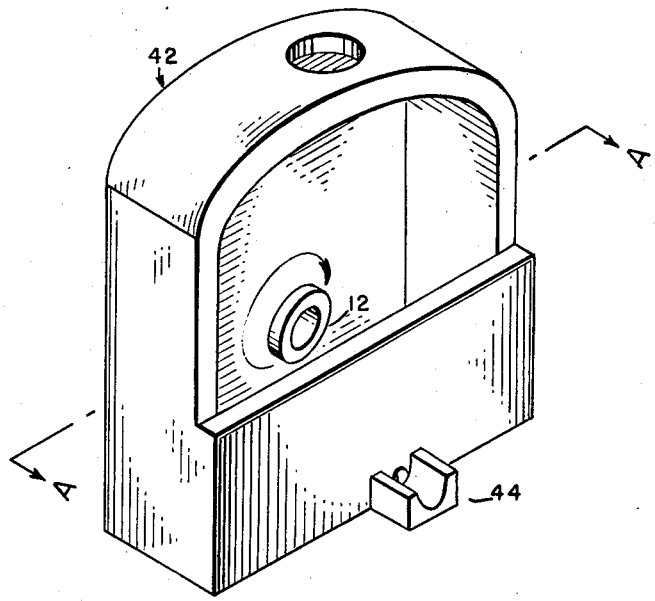
FIG. II
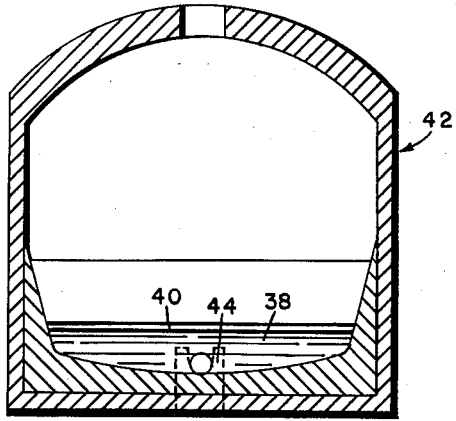
FIG. III
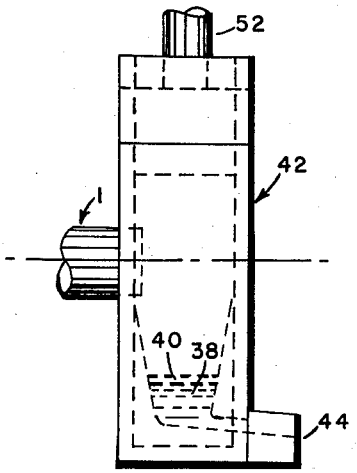
FIG. IV
INVENTOR
NORMAN P. GOSS
BY Dick M. Warburton
ATTORNEY

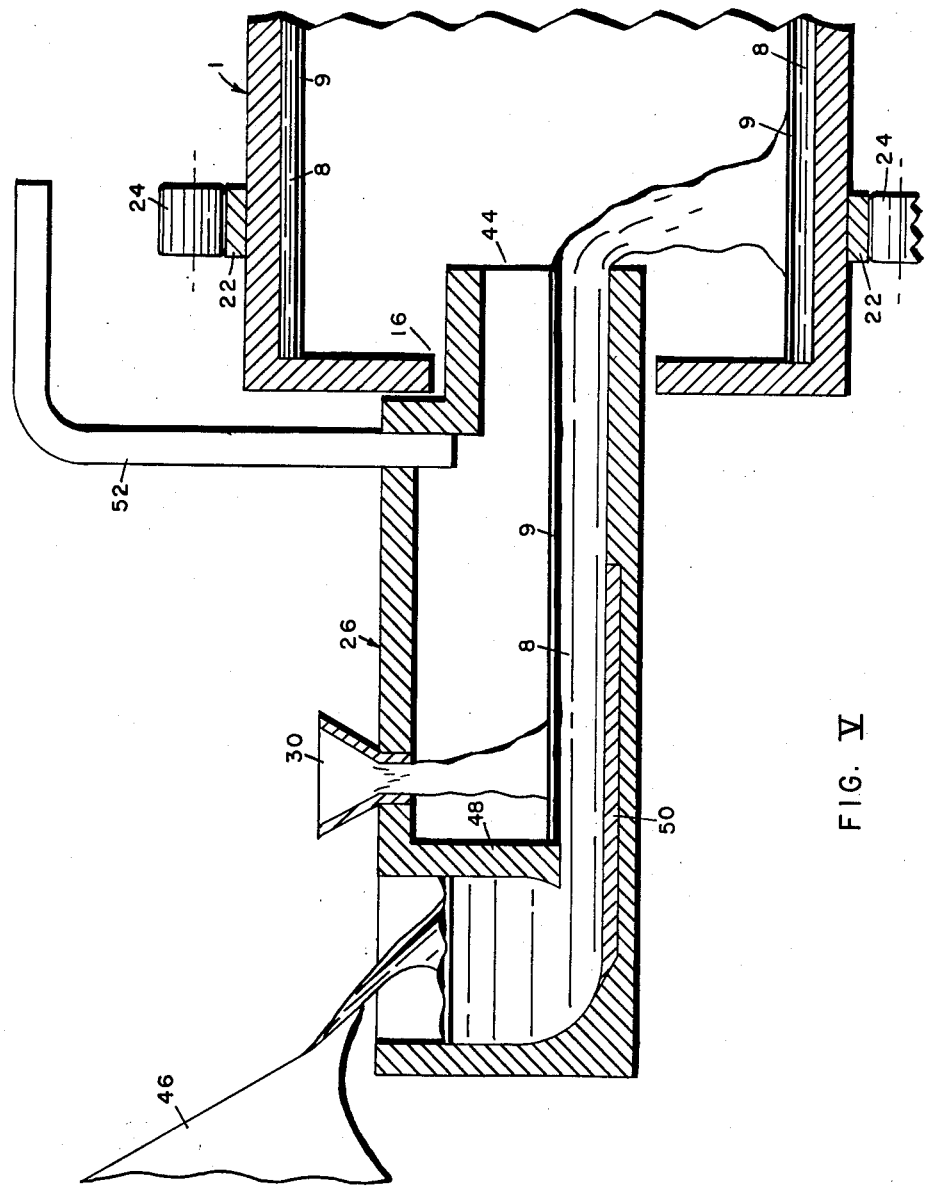

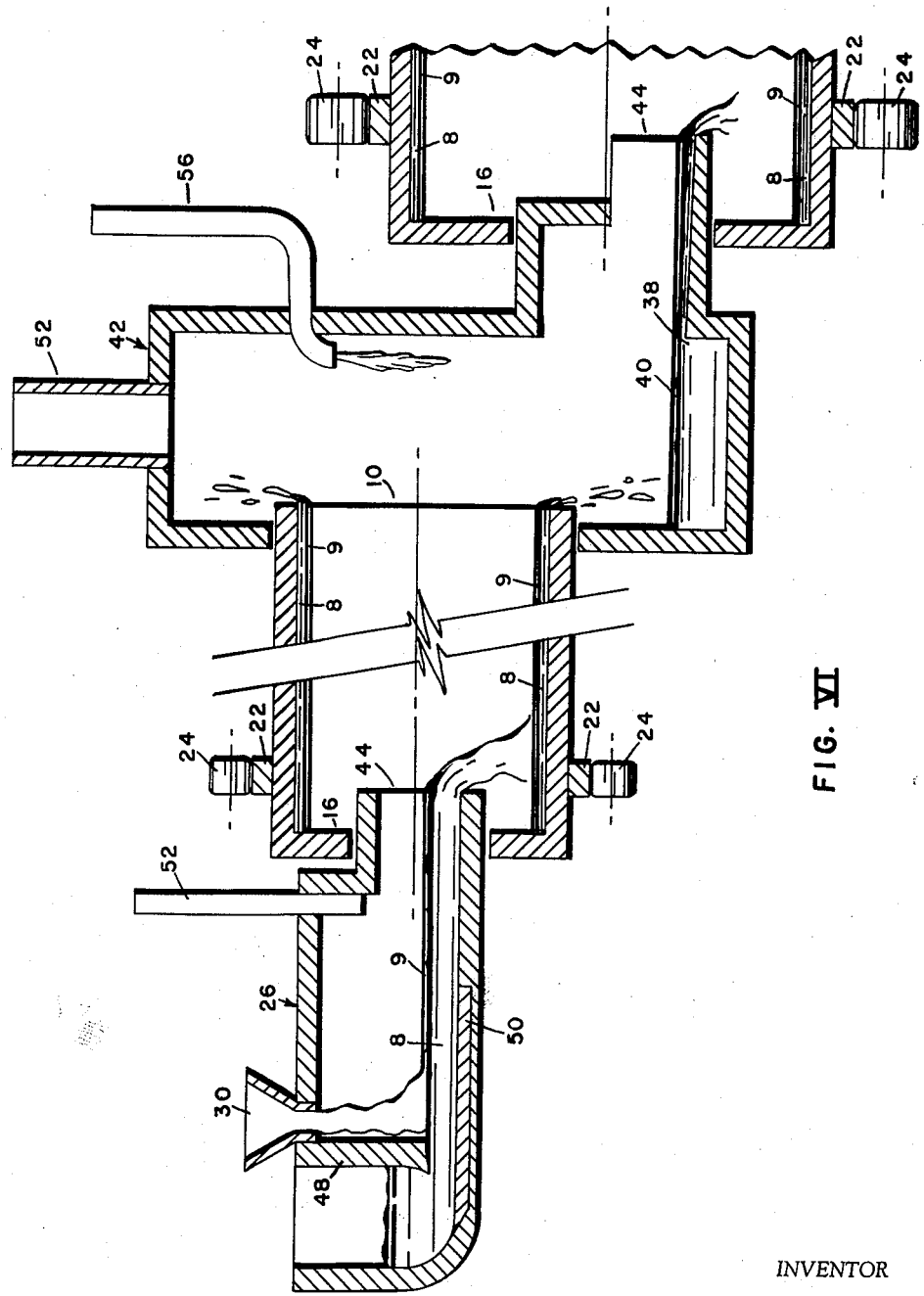

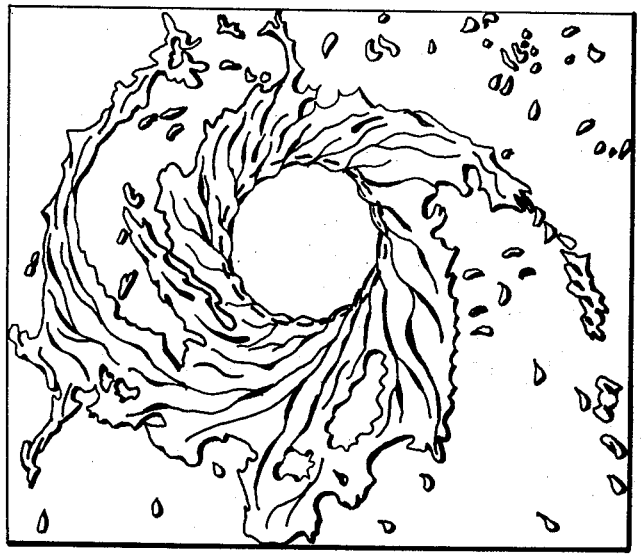
FIG. VII
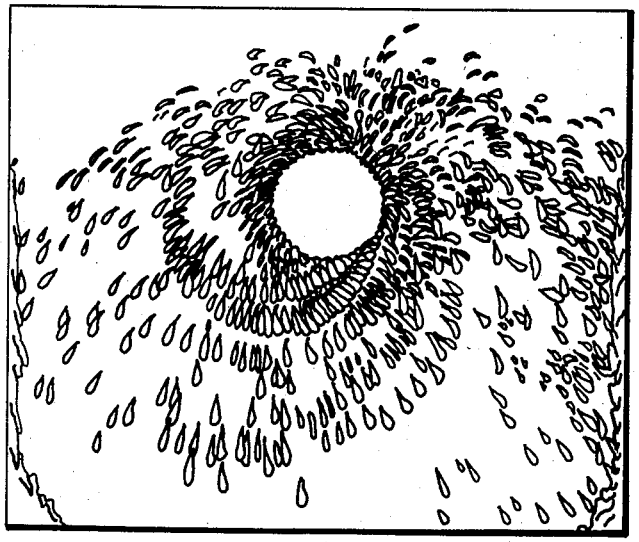
FIG. VIII

United States Patent Office 2,866,703
Patented Dec. 30, 1958

2,866,703

TREATED MOLTEN METAL

Norman P. Goss, Cleveland, Ohio, assignor to Diamond Alkali Company, Cleveland, Ohio, a corporation of Delaware Application May 28, 1956, Serial No. 587,726

15 Claims. (Cl. 75—93)

This invention relates to a physical-chemical method for treating molten metals for various purposes, such as alloying, removal of impurities, and the like, and more particularly relates to a physical-chemical method for treating molten metals while a stream of the molten metal is subjected to turbulent flow confined in a generally spiral path, and still more particularly relates to a physical-chemical method for the treatment of molten metals maintained under the condition of turbulent flow in a generally spiral path under the influence of super-gravitational forces.

It has heretofore been proposed to treat metals in the molten state by means of various chemical agents to remove undesirable impurities, such as sulfur, phosphorus, and the like. Such methods have, for the most part, taught the necessity for intimately dispersing the chemical treating agents in the molten metal bath. The dispersion of the treating agent in the molten metal bath has been accomplished by various methods, such as by adding the agent to the molten metal in the runner from the furnace, thereby employing the force of the motion of the molten metal upon impact with metal in the receiving ladle to disperse the agent, in the metal or by adding the agent to the molten metal bath in the ladle, and pouring the molten metal from one ladle into another so that the treating agent floating on the molten metal bath is carried into the bath by the force of the stream of metal as it is poured from one ladle to another. This is especially true with respect to alkaline treating agents for the removal of sulfur from pig iron, which removal is regarded as one of the most important operations in merchant iron and steel production.

In view of the improtance of the desulfurization of iron and steel industrially, the principles of the invention will be described and illustrated hereinafter in terms of desulfurizing, although it will be appreciated by those skilled in the art that the present invention is, in effect, a tool for otherwise treating iron, steel, and the like metals in the molten state, in order to remove undesirable constituents therefrom, or to add desirable constituents thereto.

In the desulfurizing of iron and steel, various alkaline desulfurizing agents have been employed in prior art methods, the most common agent being commercial sodium carbonate or "soda ash." It has long been realized that a more alkaline compound than soda ash would, at least potentially, be a more effective desulfurizing agent than soda ash or the less alkaline compounds of the alkaline earth metals. The logical material commercially available for this purpose would, of course, be caustic soda. However, caustic soda has never enjoyed wide commercial success in desulfurizing operations, and has been applied only in fairly complicated methods which are variations on the reladling method noted above, in order to protect refractory surfaces and the like with which the caustic soda comes in contact during the metal treatment.

The difficulties encountered in using caustic soda, or soda ash, in desulfurizing operations, have arisen primarily from the corrosive effect of these materials, at the temperature of molten ferrous metals, upon refractory linings of the apparatus in which the desulfurization reaction takes place; this is particularly true of caustic soda, which at the temperature of molten ferrous metal baths, i. e., above about 2500° F., rapidly attacks such refractory materials. Another difficulty encountered in the use of caustic soda, particularly in ferrous metal desulfurization, has been the vaporization or fuming of the molten caustic soda at the temperatures of metal baths, which fuming, in prior processes, has been a hazard to persons exposed thereto.

Also, in alloying ferrous metals, for example, it has heretofore been the practice to add either a ferrous metal alloy, such as ferrochrome, or ferrochrome silicon, in exothermic mixes, which when added to the molten metal undergo reaction at the temperature of the molten metal, releasing energy as heat, whereby the alloying is effected by means of a chemical reaction releasing the desired metal to the molten metal bath. In such methods, it is common to effect dispersion of the desired alloying metal in the base metal by pouring the molten metal bath together with the refining slag from one ladle to another. It will be appreciated by those skilled in the art that such methods represent a rather crude means for dispersion of one metal in another, and lead to non-uniform results in the alloy ultimately obtained.

It has now been discovered, contrary to the teachings of the prior art methods, that chemical treatments, and particularly desulfurization of molten metals containing sulfur compounds, and other undesirable impurities, may be accomplished without the necessity of providing a highly dispersed phase of the chemical treating agent in the molten metal bath in the ladle or like reservoir, and that this may be advantageously accomplished without the necessity of bringing the treating agent into contact with refractories of the apparatus in which the chemical treatment takes place. The importance of this feature of the invention will be immediately apparent to those skilled in the art.

It has also been found in accordance with the present invention, that where caustic soda, or soda ash, or a mixture of these materials, is used as a desulfurizing agent, and the fumes from these materials are maintained in contact with the molten metal for extended periods, such fumes lose their characteristic noxious properties and may be readily disposed of during desulfurization without becoming a hazard to the persons working with the desulfurizing process.

One of the objects of the present invention is to provide a physical-chemical method for treating molten metal whereby the treating agent need not be intimately dispersed in the molten metal bath.

Another object of the invention is to provide a method of treating molten metals in which method a stream of molten metal and treating agent traveling in a generally spiral path is subjected to turbulent flow in a metal-storage, metal-advancing zone whereby the surfaces of the molten metal and treating agent are continuously and rapidly presenting freshly exposed portions thereof to one another in their most reactive physical and chemical conditions.

A further object of the invention is to provide a continuous method for the treatment of molten metals whereby a stream of molten metal and treating agent is broken up into small discrete particles upon leaving said metal-storage, metal-advancing zone and during contact of the treating agent and the molten metal.

Another object of the present invention is to provide a method for removing impurities from molten ferrous metals containing sulfur compounds, silicon, phosphorus, and the like, in which method the chemical treating agent is maintained out of contact with refractory materials of the apparatus in which the chemical reaction resulting in purification of metal takes place.

Another object of the invention is to provide a method for the desulfurization of metals, in which method fumes from an alkaline desulfurizing agent may be readily disposed of without hazard to operating personnel.

These and other objects of the invention will be apparent to those skilled in the art, from a more detailed description of the invention set forth hereinbelow.

In principle, the method of the present invention for the treatment of molten metals includes the steps of subjecting a stream of said metal to turbulent flow confined in a geenrally spiral path, said path constituting a metal-storing, metal-advancing, zone for said molten metal, contacting said molten metal with a treating agent, allowing said stream to leave said path unconfined thereby disrupting said stream and forming discrete particles of molten metal, collecting said discrete particles as a continuous body of molten metal, and separating said body of molten metal from said treating agent and undesired products resulting from said contact of said molten metal and said agent.

With regard specifically to desulfurization, dephosphorization, or desiliconization, of iron and steel the term "alkaline alkali metal compound," or "alkaline desulfurizing agent," as used herein is intended to include primarily the oxides, hydroxides, carbonates, bicarbonates and silicates, of the alkali metals, lithium, sodium, potassium, rubidium, and cesium, as well as mixtures of the materials with each other, and with additives such as alkaline earth metal compounds, for example, calcium fluoride, which may be used to perform a specific function, such as fluxing (fusion and coalescing of occlusions), in the metal bath during chemical treatment. The commercial forms of the above-noted alkali metal compounds used as chemical treating agents, are, of course, predominantly the sodium compounds such as caustic soda, soda ash, and sodium silicate, which may be used in the method of the present invention in any desired combination to effect specific treatments of molten metal such as molten ferrous metals.

Also, it will be appreciated by those skilled in the art that the alkaline alkali metal compounds, specifically for desulfurization and the like, may also contain other fluxing additives, in addition to, or in place of calcium fluoride noted above, such as alkali metal borates, other alkaline earth metal oxides, fluorides, aluminum oxides, ferric oxides, manganese oxides, vanadium oxides, rare earth compounds, and the like. However, these materials preferably are not, in accordance with the present invention, sufficient in amount to destroy the desired effects of the treating agent at molten bath temperatures.

The term "turbulent flow" as used herein is intended in the engineering sense, with respect to fluid materials, and is used to characterize the flow under conditions in which turbulence of the streams of molten metal and treating agent is effected, as opposed to stream-lined flow, or quiescence, wherein turbulence does not exist in the body of the flowing fluid.

In providing for the turbulent flow of the molten metal and the treating agent, the streams are so controlled and confined as to present to each other substantially coextensive, continuously changing, fluid surfaces, at the interface and the usual technique of maintaining intimately dispersed treating agent within the molten metal bath is completely avoided. One means for providing for the turbulent flow of the molten metal and the treating agent, in accordance with the principles of the present invention, and which allows the streams to leave the generally spiral path in the metal-storing, metal-advancing zone, unconfined, whereby disruption of the streams and the forming of discrete particles of molten metal is effected in contact with treating the agent, is a rotating cylinder provided with means for imparting sufficient rotational speed of the cylinder to cause the molten metal to form a continuous layer upon the internal surfaces of the cylinder.

The principles of the present invention may be considered somewhat more in detail by reference to the drawings attached hereto and made a part hereof, wherein:

Fig. I is a vertical section, with parts broken away, of an apparatus suitable for treating molten metals in accordance with the principles of the present invention;

Fig. II is an isometric view of one means for collecting molten metal issuing from the discharge end of the apparatus of Fig. I, the collecting means having a part of the front cover removed to expose the discharge end of apparature of Fig. I, and showing an opening, not shown in Fig. I, for a fume duct;

Fig. III is a vertical section of the collection means of Fig. II, viewed in the direction of the line A—A;

Fig. IV is a side view of the collection means of Fig. II, with the front cover in place, internal structure being indicated by dotted lines, and showing a fume stack in place;

Fig. V is a diagrammatic showing of a variation of the apparatus of Fig. I, with parts broken away, specifically adapted for the addition of treating agent to the molten metal in a runner to the apparatus of Fig. I, the metal being supplied to the runner from a ladle;

Fig. VI is a diagrammatic showing of a variation of the apparatus of Figs. I and V, wherein the molten metal may undergo treatment in two successive stages by arranging two or more units of the apparatus in series;

Fig. VII is a tracing of an enlargement from a slow-motion moving picture film showing the trajectory pattern of molten metal being discharged into the collection means of an apparatus of the type illustrated in Figs. I–IV, and VI, where the cylinder is rotated at very nearly the critical speed, i. e., the speed at which the centerpetal acceleration imparted to the metal undergoing treatment is just sufficient to maintain the molten metal in the form of a continuous layer on the inner surface of the cylinder;

Fig. VIII is also a tracing of an enlargement from a slow-motion moving picture film, showing the trajectory of the molten metal discharged into the collection means of the apparatus of Figs. I–IV, and VI, wherein the speed of rotation of the cylinder is well above that required to cause the metal to form a continuous layer on the inner surfaces of the cylinder.

In the drawings, the rotatable cylinder 1, comprises steel shell 2, having a refractory lining 4 over which may be placed a monolythic layer 6 of a suitable refractory, such as magnesium oxide. Steel shell 2, and layers 4 and 6 are not differentiated in Figs. V and VI, since the showing of these figures is primarily for purposes of illustration of an arrangement of apparatus, rather than structural details thereof. However, the structural details of the apparatus of Figs. I–IV are also appropriate in the apparatus of Figs. V and VI.

The cylinder 1 is adapted for rotation at speeds sufficient to maintain a continuous layer of molten metal covering the surface of the inner refractory layer 6. The rotation of the cylinder is effected by driving means not shown. The cylinder 1 has at its discharge end 10, a nose ring 12, preferably constructed of refractory material, shaped as shown in Fig. I, and held in place securely against steel shell 2 by means of bolts 14, or the like; also secured to steel shell 2 is retainer ring 15 which serves as a baffle between collection hood 42 and cylinder 1. At the feed end 16 of the cylinder is a dam ring 18 with appropriate formation of contours of insulating layer 4 and refractory layer 6, so as to maintain a layer of molten metal with the cylinder, dam ring 18 extending a sufficient distance from the periphery of the steel shell 2, to insure discharge of the molten metal at the discharge end 10 of the cylinder. Nose ring 12, and insert 20 at feed end 16 of the cylinder, are preferably fashioned of carbon, or like refractory, which is resistant to strong alkalies at the temperatures of the molten metal undergoing treatment.

The steel shell 2 of the cylinder 1 is suitably equipped with tires 22, which engage rollers 24 in such a manner as to insure as nearly as possible a smooth rotational motion of the cylnider when the cylinder is rotated at a speed sufficient to cause the molten metal to form a continuous layer over the inner surfaces thereof.

In this regard, it has been found that in a rotating cylinder such as that shown in Fig. I having an inside diameter, for example, of 1 foot, and designed for a depth of molten metal of about 1 inch, a rotational speed of the order of 350 R. P. M. is more than sufficient to insure maintaining molten iron in a continuous layer next to the refractory lining during operation.

From the above dimensions and rotational speed it is readily calculated that at the lining-molten metal interface a force of about 21 times that of gravity is applied, and at the surface of the molten metal a force of about 17 times that of gravity is applied. These calculations are made by determining the centripetal acceleration, ($Ac$), in ft./sec. from velocity, in ft./sec. (V), and the radius ($r$), from the equation $$Ac = \frac{V^2}{r}$$

the applied force, in terms of gravity, is then caculated from the formula $$\frac{Ac}{g}$$

where $g$ is acceleration due to gravity (980.6 cm./sec.$^2$ or 32.17 ft./sec.$^2$).

These forces of about 17–21 times that of gravity, represent ordinarily the desirable maximum for adjusting the rotational speed of the cylinder, although greater rotational speeds imparting greater forces may be employed; lesser forces of the order of 10–12 times that of gravity are suitable for most purposes of the present invention. Where the force applied to the molten metal in the cylinder, for example, iron, is less than about 6–8 times that of gravity, cascading of the molten metal within the cylinder is effected, and in the event that a strongly alkaline compound is used as a treating agent, for example, caustic soda, erosion of the ordinary refractories in the lining of the rotating cylinder is accelerated considerably. Accordingly, in the practice of the present invention, where such strongly alkaline treating agents are employed, cascading of the molten metal within the rotating cylinder is to be avoided, and the force applied to the molten metal should be sufficient to maintain a continuous layer thereof in contact with the refractory lining.

At the feed end 16 of the rotating cylinder there is provided a runner 26, which may be adapted to receive a chemical treating agent, such as a desulfurizing agent, for example caustic soda, through spout 30, which may also serve as a fume duct, although fuming in this area is not a serious problem, when provision is made subsequently in the process for removal of fumes, as will be seen from the description hereinbelow. Treating agent and metal may, of course, be introduced into the cylinder separately. Runner 26 is supplied with molten metal from a suitable means 32, which may take the form of a tundish, and which in turn may be supplied from a ladle or other suitable source.

Runner 26 and tundish 32, are preferably lined with suitable refractory material such as carbon lining 34 for runner 26, where strongly alkaline treating agents are employed, and magnesia, or the like, lining 36 used for tundish 32.

In operating the apparatus of Figs. I–IV, in accordance with the method of the present invention, molten metal is introduced into tundish 32, from whence it flows through runner 26 into the rotating cylinder 1.

Introduction of the molten metal and treating agent, is preferably effected after the rotating cylinder has reached a rotational speed such that a force of from 10–16 times that of gravity is applied to the molten metal in the cylinder whereby, a continuous layer of molten metal is spread over the entire inner surface of a cylinder.

With the cylinder rotating to provide the above conditions, the continuous layer 8 of molten metal next to the refractory lining 6 will, of necessity, have a different rotational speed from that of the layer treating agent 9, as well as the drum, which differential in rotational speeds, together with the slight amount of inherent vibration characteristic of rotating cylinders, effects the turbulent flow of the molten metal, as it moves in a generally spiral path from one end of the cylinder to the other. The treating agent, which is preferably either soda ash or caustic soda, more suitably the latter, due to its viscosity, as well as its mass, will also have a rotational speed different from that of the molten metal and, hence, at the interface between the layers, there will be a strong shearing action which will also cause turbulent flow of both the molten metal and treating agent as they move from one end of the cylinder to the other.

It is believed that this strong shearing action, contributing to the turbulence of both molten metal and treating agent, causes their surfaces, at the interface, to be continuously in a state of motion and, therefore, continuously rapidly changing with time as to the components which each presents at the interface. In this manner, a tremendously large surface of molten metal is exposed to a similarly large surface of treating agent, in a very brief period of time, with the result that a very large proportion of the contaminating materials of the molten metal are subjected to contact with the treating agent, and are removed from the molten metal in this same period of time.

In addition, where anhydrous caustic soda is used as the treating agent, such caustic soda may be at or above its boiling temperature, particularly with molten ferrous metals which are customarily desulfurized at temperatures above 2500° F. and, hence, the layer of molten caustic soda may be separated slightly from the molten ferrous metal by vapors of caustic soda, which in rising through the molten caustic soda layer would cause additional turbulence therein. Moreover, since the layers of molten ferrous metal and caustic soda are maintained in a supergravitational field, compression at the interface may also cause diffusion of caustic soda to some extent into the molten metal, and thereby add to the total contact area of desulfurizer and metal at the interface, whereby reaction time for removal of impurities is considerably decreased.

As the molten metal and chemical treating agent, in the specific instance referred to above, caustic soda, leave the cylinder through the discharge end 10, the fluid materials follow the inner contours of the nose ring 12, terminating the substantially spiral path which they have traveled through the rotating cylinder and are severely disrupted as they leave the end of the nose ring tangentially thereto. This effect is diagrammatically illustrated in Figs. VII and VIII, as will be described hereinbelow.

This severe disruption, where the rotational speed of the cylinder is just sufficient to maintain a continuous layer of molten metal on the inside of the rotating cylinder, causes the stream of metal to assume a trajectory pattern such as that shown in Fig. VII, the particles of molten metal together with the chemical treating agent being relatively large, and in an extreme state of turbulence. With the cylinder rotating at such a speed as to impart to the molten metal in the cylinder a force of the order of 12–16 times that of gravity, the molten metal, as it leaves the spiral path which it has traced in the rotating cylinder, is even more severely disrupted, being disintegrated into a large number of comparatively small particles having a trajectory pattern such as that shown in Fig. VIII.

A further factor to be considered in this regard is that caustic soda, or soda ash, because of their tendency to vaporize at the temperatures at which molten iron or steel, for example, are desulfurized, present an extremely active atmosphere in contact with the molten metal both in metal-storage metal-advancing zone, and in the region where the spiral path of the metal is terminated and the metal stream is disrupted. In the latter region there is, in effect, a dispersion of molten metal in the treating agent vapors. This condition is, of course, brought about by the fact that the particles of molten metal, together with some slag and/or treating agent, are propelled through the active atmosphere upwardly a short distance, outwardly a greater distance, and ultimately downwardly with considerable force into a pool 38 of molten metal which may have an overlaying layer 40 of slag, or other chemical treating agent, whereby the molten metal may be continuously subjected to chemical treatment prior to and during collecting into a continuous body in the collection hood 42, as shown in Figs. II, III, and IV. Molten metal in discharge hood 42, may be removed therefrom through spout 44 to suitable means for separation of metal and treating agent where such treating agent is not volatile at the temperature of the molten metal, or hood 42 may be adapted for separation of metal and treating agent therein. Where a treating agent such as caustic soda or soda ash is used, a fume duct 52, shown in place in Fig. IV for the apparatus of Figs. I–IV, is preferably employed as a means for separation of the volatilized material from molten metal.

In Fig. V, metal from ladle 46 is introduced into a runner 26 having a baffle plate 48; in this apparatus, spout 30 may take the form of a funnel through which treating agent such as caustic soda is introduced into the runner. Also, runner 26 has refractory layer 50, preferably of carbon or like material resistant to strong alkali at the temperature of the molten metal, where caustic soda or soda ash, is used as the treating agent. In addition, a fume duct 52 may, if desired, be attached to runner 26, although for reasons noted above, it is preferable to locate the fume duct in the collection hood at the discharge end of the cylinder so as to gain maximum advantage of the vapors resulting from contact of alkali and molten metal.

As shown in Fig. VI, more than one of the rotating cylinders and collection hoods shown in Fig. I, may be employed in series, for successive treatment of the metal, such as desulfurization in the first rotating cylinder, and dephosphorization with an oxidizing slag in the second rotating cylinder, the slag, or fluxing material, being introduced through flux feeder 56, into the intermediate collection hood 42. Further treatment of the molten metal may be effected in either or both of such cylinders arranged in series, by the introduction of a gas, such as oxygen, so that the atmosphere within the apparatus contains chemically active constituents in addition to vapors resulting from contact of molten metal and alkali treating agent.

It will be appreciated by those skilled in the art that by employing the principles of the present invention, as described above and further illustrated in the drawings, one may readily obtain "washed" metal by one or more agents for treatment of the molten metal, whereby the desired chemical treatment is accomplished at considerably less cost than is now attendant upon the preparation of iron for the open hearth in accordance with present commercial practice.

Also, it will be appreciated by those skilled in the art that although concurrent flow of chemical treating agents and molten metal is illustrated in the drawings hereof, countercurrent contact of chemical treating agent and molten metal may also be effected and is contemplated within the scope of the present invention, although such practice is ordinarily not preferred; this for the reason that it is highly desirable that the molten metal be associated with the chemical treating agent upon its discharge from the discharge end of the rotating cylinder at the time the spiral path taken by the molten metal stream is terminated, and the molten metal stream is disrupted and broken down into a large number of comparatively small particles upon entering the collection chamber 42 of the apparatus.

Further, the various gaseous treating agents which may be employed, may be introduced into the collection hood 42, wherein the particles of molten metal are in their most finely divided form, or in the rotating cylinder, or both, thereby affording the dual action of such gaseous agents and a less volatile chemical treating agent, to the end that such dual action may be accomplished by a single step, and in a single piece of apparatus, as opposed to present practice of multiple steps in several apparatus.

From the description hereinabove, and in accordance with the principles of the present invention, it will be apparent that upon introducing the molten metal into the rotating cylinder, or by otherwise imparting rotational movement to the molten metal stream, the molten metal moves through the metal-storing, metal-advancing zone in a generally spiral path, while being subjected to relatively violent turbulent flow. Also, it will be apparent that whether the treating agent is a liquid, or a gas, at the temperature of the molten metal, contact of the treating agent and metal is effected over substantially the entire exposed surface of the metal, and that turbulence of the treating agent results both from the rotational movement of the metal and by its movement through the metal-storing, metal-advancing zone. As the molten metal and treating agent leave this zone, the generally spiral path of the molten metal stream is severely disrupted due to the centripetal acceleration imparted by the rotational motion, whereupon the direction of flow of the molten metal stream is radically changed causing the continuous molten metal stream to be disrupted, or "atomized," to form a large number of comparatively small particles which traverse the atmosphere extant in the collection hood at the discharge end of the apparatus, prior to collection into a continuous body of molten metal. It is, therefore, seen that the molten metal both in the metal-storing, metal-advancing zone, and in the zone in which the particles of molten metal are collected into a continuous body, is in condition for maximum reaction of the contaminants with chemical treating agent.

In order that those skilled in the art may better understand the present invention, and to demonstrate the manner in which the above principles may be applied, the following specific examples are offered:

*Example I*

In an apparatus such as that illustrated in Figs. I–IV of the drawings, the cylinder, having a 10½ inch inside diameter at the nose ring, is rotated at a speed sufficient to impart a force of about 6 times that of gravity upon molten pig iron which is introduced into the cylinder at the rate of 5 tons per hour, while anhydrous caustic soda is introduced into the runner to the rotating cylinder at the rate of 20 lbs. per ton of iron.

The pig iron before treatment has the following analysis:

| | Percent |
|---|---|
| Carbon | 3.95 |
| Silicon | 1.35 |
| Sulfur | 0.044 |

Four minutes after the first introduction of iron and caustic soda into the rotating cylinder a sample of the metal is taken at the discharge end of the cylinder and is found to have the following analysis:

| | Percent |
|---|---|
| Carbon | 3.90 |
| Silicon | 0.64 |
| Sulfur | [1] less than 0.002 |

[1] This represents the limit of the accuracy of the analytical method employed.

It is seen that 53% of the silicon has been removed from the pig iron, and 96% of the sulfur has been removed, by the above treatment.

Example II

Following the procedure of Example I, and in the same apparatus employed for that purpose, molten pig iron is introduced into the rotating cylinder at the rate of 10 tons per hour, while the amount of anhydrous caustic soda fed to the rotating cylinder is 20 lbs. per ton of pig iron. Rotational speed is the same as that for Example I.

The effluent from the collection hood is drawn off into a ladle and recycled to the feed end of the rotating cylinder of the apparatus without reheating, and is introduced into the rotating cylinder with an additional amount of flaked caustic soda in the proportion of 20 lbs. per ton of molten metal, the rate of the molten metal feed being 30 tons per hour.

The pig iron prior to treatment in the rotating cylinder has the following analysis:

| | Percent |
|---|---|
| Carbon | 4.02 |
| Silicon | 1.41 |
| Sulfur | 0.049 |

The treated iron collected in the ladle in the first step of the above process, has the following analysis:

| | Percent |
|---|---|
| Carbon | 3.97 |
| Silicon | 1.27 |
| Sulfur | 0.012 |

Following the recycle of the molten pig iron from the first treatment, the molten metal is again collected in a ladle, and has the following analysis:

| | Percent |
|---|---|
| Carbon | 3.96 |
| Silicon | 1.03 |
| Sulfur | 0.007 |

The above illustrates the effectiveness of employing successive treatments of the metal with a treating agent, as illustrated diagrammatically in Fig. VI of the drawings. Also, it is to be noted that no substantial temperature drop over that expected by transferring molten metal from the collecting ladle back to the feed end of the cylinder, was encountered in this operation.

Example III

Molten pig iron is introduced into an apparatus of the same type as that used in Example I, at the rate of 8 tons per hour. Caustic soda is simultaneously introduced into the runner feeding the rotating cylinder at the rate of 20 lbs. of caustic soda per ton of molten metal. The rotational speed is such that the force applied to the molten metal at the nose ring is 7.25 times that of gravity.

The molten pig iron fed to the rotating cylinder has the following analysis:

| | Percent |
|---|---|
| Silicon | 1.38 |
| Sulfur | 0.040 |

At the discharge end of the rotating cylinder, the molten metal collected in the collection hood is run off into a ladle, a sample taken for analysis, and the following values obtained:

| | Percent |
|---|---|
| Silicon | 1.17 |
| Sulfur | 0.008 |

Example IV

Following precisely the same procedure as that for the preceding examples, molten pig iron containing 1.61% silicon, and 0.032% sulfur, is introduced into a rotating cylinder at the same rate and with the same amount of caustic soda per ton of molten metal, as that employed in the preceding example.

Employing this procedure, and sampling the effluent from the collection hood about 2 minutes after the introduction of molten iron, caustic soda, and oxygen into the rotating cylinder, the treated metal is found to contain 1.15% silicon and 0.017% sulfur. In this example, the cylinder is rotated at such a rate that the force applied to the molten metal is 7.25 times that of gravity upon the metal in the cylinder.

Example V

Molten pig iron is fed to a rotating cylinder such as that illustrated in Fig. I, the collection hood having a removable cover exposing the entire discharge end of the rotating cylinder and a substantial distance above and below this portion of the apparatus. The molten metal is fed to the rotating cylinder at the rate of about 5 tons per hour with the cover of the collection hood removed to expose the metal being discharged from the cylinder.

With the cylinder rotating at such a speed as to impose upon the metal at the nose ring, a force equal to about 4.5 times that of gravity, the molten metal discharged from the cylinder has a shower pattern, or a trajectory, such as that shown in Fig. VII. These facts are established by taking slow motion moving pictures of the discharge end of the cylinder.

By increasing the rotational speed of the cylinder to a point where the force imposed upon the molten metal at the nose ring is equal to 7.25 times that of gravity, the molten metal issuing from the discharge end of the rotating cylinder has a shower pattern, or trajectory, of the type shown in Fig. VIII, as also established by slow motion moving pictures taken during the operation of the cylinder at this speed and with molten metal being introduced thereinto at the rate indicated above.

Example VI

Molten pig iron is fed to the apparatus employed in the previous examples, and treated with anhydrous caustic soda in the manner described therein for a suitable period of time sufficient to effect the desired treatment of the metal. Thereafter, the source of molten metal and caustic soda are shut off, and rotation of the cylinder continued at a speed sufficient to impose upon the metal in the cylinder a force equal to about 8 times that of gravity, and for a period of time sufficient to allow cooling of the molten metal in the cylinder to the freezing point thereof, after which rotation of the cylinder is stopped. Subsequently, the rotation of the cylinder is again initiated at the former speed, while hot gases are passed therethrough in order to heat the metal to very near its melting point, following which further quantities of molten metal and caustic soda are introduced into the cylinder for further treatment.

Following this latter treatment, the cylinder is emptied of all molten metal, cooled, and examined for failure of any of the internal parts thereof. It is observed that under the conditions of all the examples described hereinabove, a continuous layer of molten metal is retained next to the innermost lining of the rotating cylinder to protect such lining from the caustic soda at the temperature of operation. Moreover, it is noted that except for a slight amount of erosion of the innermost lining, probably due to friction alone, no internal damage to the cylinder is noted.

This application is a continuation-in-part of my application Ser. No. 536,185, filed September 23, 1955.

While there have been described various embodiments of the invention, the methods and problems described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of treating molten metal which includes the steps of subjecting a continuous stream of said metal to turbulent flow confined in a generally spiral path, said path constituting a metal-storing, metal-advancing zone, contacting said molten metal with a treating agent, allowing said stream to leave said path unconfined thereby disrupting said stream outside of said spiral path to form discrete particles of said molten metal, collecting said discrete particles as a continuous body of molten metal, and separating said body of molten metal from said treating agent and undesired products resulting from said contact of said molten metal and said agent.

2. The method of treating molten metal which includes the steps of subjecting a stream of said metal to turbulent flow moving as a continuous body thereof confined in a generally spiral path, said path constituting a metal-storing, metal-advancing zone, contacting said molten metal with a treating agent, causing said stream to leave said path unconfined thereby disrupting said stream and forming discrete particles of said molten metal, collecting said discrete particles as a continuous body of molten metal, and separating said body of molten metal from said treating agent and undesired products resulting from said contact of said molten metal and said agent.

3. The method of claim 2 in which said contact of said treating agent and said molten metal is effected while said molten metal is traveling in said path, and is continued during the disrupting of said stream to form discrete particles of said molten metal.

4. The method of claim 2 wherein said treating agent comprises a gas reactive with at least one of the constituents of said molten metal stream.

5. The method of claim 2 wherein the treating agent comprises an alkaline alkali metal compound and a gas reactive with at least one of the constituents of said stream of said molten metal.

6. The method of treating impure molten metal to remove impurities therefrom, which method includes the steps of subjecting a stream of said molten metal to turbulent flow as a continuous body confined in a generally helical path, said path constituting a metal-storing, metal-advancing zone, contacting the surface of said stream of molten metal with a treating agent reactive with at least one of the impurities thereof while flowing in said path, causing said stream to leave said path unconfined, thereby disrupting said stream and forming discrete particles of said molten metal, collecting said discrete particles as a continuous body of molten metal, and separating said body of molten metal from said treating agent and undesired products resulting from said contact of said molten metal and said agent.

7. The method of claim 6 wherein said contact of said treating agent and said molten metal is concurrent, and said treating agent is an alkaline alkali metal compound.

8. The method of treating molten metal which includes the steps of subjecting a stream of molten metal to turbulent flow as a continuous body confined in a generally spiral path, said path constituting a metal-storing, metal-advancing zone, forming said body into a generally hollow cylindrical shape in said zone, contacting the surface of said stream of molten metal with a treating agent in said zone, forming discrete particles from said body by causing said molten metal to leave said path unconfined, thereby disrupting said stream, collecting said discrete particles as a second body of molten metal, and separating said second body from said treating agent and undesired products resulting from said contact of molten metal and treating agent.

9. The method of claim 8 wherein said treating agent is a substance which forms an alloy with said metal.

10. The method of claim 8 wherein said treating agent reacts with at least one of such impurities at the temperature of said molten metal.

11. The method of treating molten metal containing impurities to remove impurities therefrom which method includes the steps of subjecting a stream of molten metal to turbulent flow as a continuous body confined in a generally helical path, said path constituting a metal-storing, metal-advancing zone, forming said body of molten metal into a generally hollow cylindrical shape in said zone, contacting the surface of said body of molten metal with a treating agent comprising an alkaline alkali metal compound, and an atmosphere containing a gaseous constituent reactive with at least one of the impurities of said molten metal, forming discrete particles of said body of metal and alkaline treating agent by allowing said stream to leave said path unconfined thereby disrupting said body, passing said discrete particles through said atmosphere, collecting said discrete particles as a second continuous body of molten metal, and separating said second body of molten metal from said treating agent and said atmosphere as well as undesired products resulting from said contact of said molten metal, said agent, and said atmosphere.

12. The method of claim 11 wherein said second body of molten metal is subjected to a second treatment in a second metal-storing, metal-advancing zone, in a generally helical path, said second body also being formed into a generally hollow cylindrical shape in said zone.

13. The method of treating molten metal to remove impurities therefrom, which method includes the steps of subjecting a stream of molten metal to turbulent flow as a continuous body in a generally helical path, said path constituting a metal-storing, metal-advancing zone, forming said body of molten metal into a generally hollow cylindrical shape in said zone, contacting said body of molten metal while traveling in said path, with an alkaline composition containing slag-forming constituents, maintaining said body of molten metal and said alkaline composition in substantially coextensive and continuous adjacent contact in said zone, forming discrete particles of said metal and said alkaline composition by causing said stream of molten metal and said alkaline composition to leave said path unconfined thereby disrupting said body, collecting said discrete particles as a second continuous body of molten metal with an overlaying layer of slag from said slag-forming constituents allowing further portions of said stream to leave said helical path unconfined, thereby disrupting said further portions of said stream to form discrete particles thereof, passing said discrete particles through said layer of slag and into said second body of molten metal, and separating said second body of molten metal from said slag and undesired products resulting from said contact of said molten metal and said alkaline composition.

14. The method of claim 13 wherein the turbulent flow of said body of metal is maintained by imparting rotational motion to said body in said zone, while in contact with said alkaline composition.

15. The method of claim 13 wherein said rotational motion is employed to create a centrifugal force in said body of metal sufficient to maintain said substantially coextensive and adjacent surfaces of said stream.

References Cited in the file of this patent

UNITED STATES PATENTS

| | | |
|---|---|---|
| 291,223 | Pielstizker et al. | Jan. 1, 1884 |
| 399,115 | Adams et al. | Mar. 5, 1885 |
| 2,128,444 | Vroonen | Aug. 30, 1938 |
| 2,355,885 | Merle | Aug. 15, 1944 |